C. CAPOOCH & E. DESSUREAU.
FISHING FLOAT.
APPLICATION FILED MAY 16, 1917.
1,241,707.
Patented Oct. 2, 1917.
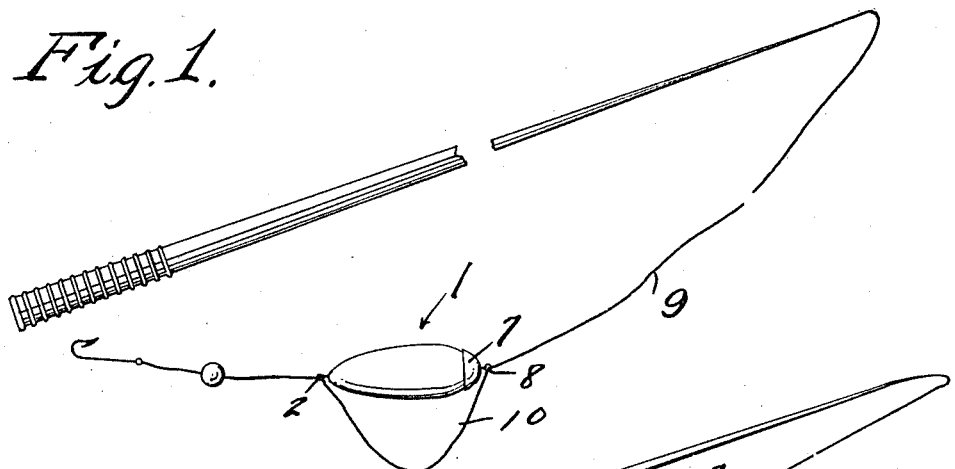
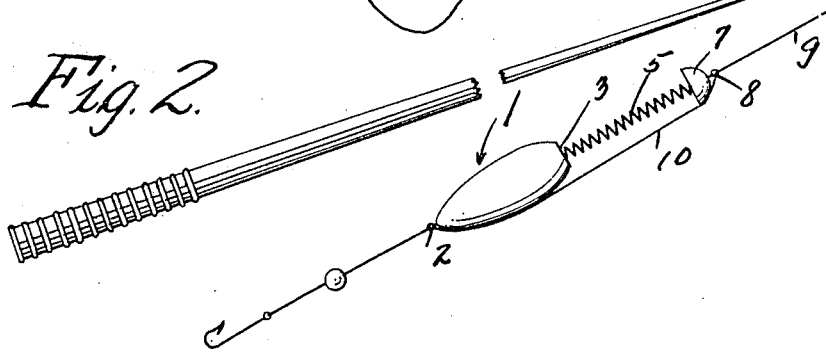
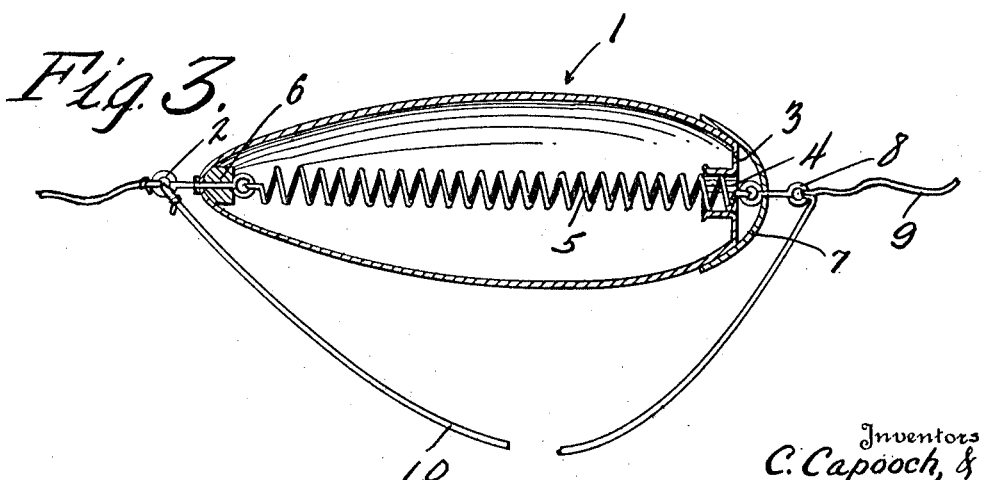
Witnesses
G. C. Walling
H. C. Pitman
Inventors
C. Capooch, &
E. Dessureau
By Chandler & Chandler
Attorneys the pole, we have constructed a combination
UNITED STATES PATENT OFFICE.

CARMINE CAPOOCH, OF DANBURY, AND ERNEST DESSUREAU, OF MERIDEN, CONNECTICUT.

FISHING-FLOAT.

1,241,707.  Specification of Letters Patent.  Patented Oct. 2, 1917.

Application filed May 16, 1917. Serial No. 169,147.

*To all whom it may concern:*

Be it known that we, CARMINE CAPOOCH and ERNEST DESSUREAU, citizens of the United States, residing at Danbury and Meriden, in the counties of Fairfield and New Haven, State of Connecticut, have invented certain new and useful Improvements in Fishing-Floats; and we do hereby declare the following to be a full, clear, and exact description of the invention, such as will enable others skilled in the art to which it appertains to make and use the same.

This invention relates to fishing line floats.

The object of the invention is to construct a fishing line float which is also a casting device. It is well known among the fishermen that considerable skill is required to cast a pole carried line from a bank which is closely grown with trees and shrubbery, and that it is also difficult to cast a line while in a sitting posture, it usually being necessary for the fisherman to stand, to cast a line, an operation which is often inconvenient and sometimes dangerous, when the fisherman occupies a precarious position on a rock. Therefore, in order to overcome the disadvantages above noted, by making it possible for the fisherman to cast the line without the usual preliminary swinging of the pole, we have constructed a combination float and casting device, which will, in effect, provide the necessary impetus for carrying the line to the spot where it is desired to make the cast.

As a subsidiary object, it is intended to construct the casting device of such character that the line may be cast to varying distances, dependent upon a certain preliminary adjustment.

With the above objects in view and such others relating to the details of construction, as may hereinafter appear, our invention will now be fully set forth and described, reference being had to the accompanying drawings.

In the drawings:—

Figure 1 is a view of the float attached to the line and occupying its normal position, Fig. 2 is a view showing the float in casting position, and Fig. 3 is a longitudinal section through the float.

Referring more particularly to the drawings, 1 indicates the float which is, preferably, a hollow metal receptacle of the usual conformation, and has at its lower end line attaching eye 2. The upper end of the float 1 is shaped into a flattened face 3, which is centrally apertured to provide an entrance 4 into the float body. The margin of the opening 4 is rounded into a guide tube which will permit the free passage into or out of the slot of resilient element 5. One end of the resilient element 5, which, while preferably being formed of a coil spring, may be an elastic band or similar body, is permanently fixed to a block 6, mounted in the lower end of the float body 1. The opposite end of the resilient element 5 is secured centrally within the cap 7, which fits over and conforms to the conformation of the upper end of the body 1, and provides a tight closure for the entrance 4, so that, there is no danger of the water gaining access to the interior of the float body. The apex of the cap 7 is provided with an eye 8 to which the line may be attached.

The resilient element 5, as above stated, may be a spring or an elastic band, and may be expanded for a considerable distance out of the body 1. When the line 9 is connected to the eyes 2 and 8, a certain amount of slack 10 is provided. The slack 10 provides the limit to which the spring 5 may be expanded, and by an adjustment of the length of the slack 10 the contractive force of the spring, when it is released from its expanded condition may be variably regulated.

In the use of the device as a casting means, the lower or hook end of the line 9 is grasped in one hand while the pole is held in the other. The hook end of the line is then pulled until the parts of the float are extended to the limit of the slack 10, as indicated in Fig. 2.

The then tensioned line is released, the impetus imparted to the float, and consequently to the line by the contraction of the spring 5 causes the float and line to be projected away from the fisherman, and toward the spot to which he has directed the float. The distance to which the line may be cast, within the limits of the power of the spring, is determined by the amount of slack 10 which is initially provided, and it is observed that the amount of slack is quickly adjusted by setting the line with respect to the eyes 2 and 8.

It is apparent from the foregoing description that we have provided a very practical and extremely simple line casting device and have utilized as a casting device, the float, which is a necessary appurtenance of all deep water fishing outfits.

What we claim as our invention is:—

1. A combination float and casting device, comprising in combination, a float body, a separable cap therefor, a resilient element connecting the float and cap, and means for connecting a line to the float and cap.

2. A combination float and casting device, comprising in combination a hollow float body, having an opening at one end, a closure cap for the opening, a resilient element in the float body and having its ends connected to the latter and the cap respectively, means for connecting the bight of a line to the closed end of a float body, means for connecting another portion of the line to the top of the cap, said connections permitting regulated amounts of slack line to be carried between the float and cap.

In testimony whereof, we affix our signatures in the presence of two witnesses.

CARMINE CAPOOCH.
ERNEST DESSUREAU.

Witnesses:
JACK MARTIN,
HENRY BENOURT.

Copies of this patent may be obtained for five cents each, by addressing the "Commissioner of Patents, Washington, D. C."